June 12, 1962     B. H. ROWE     3,038,683
VTOL AIRCRAFT
Filed April 20, 1961
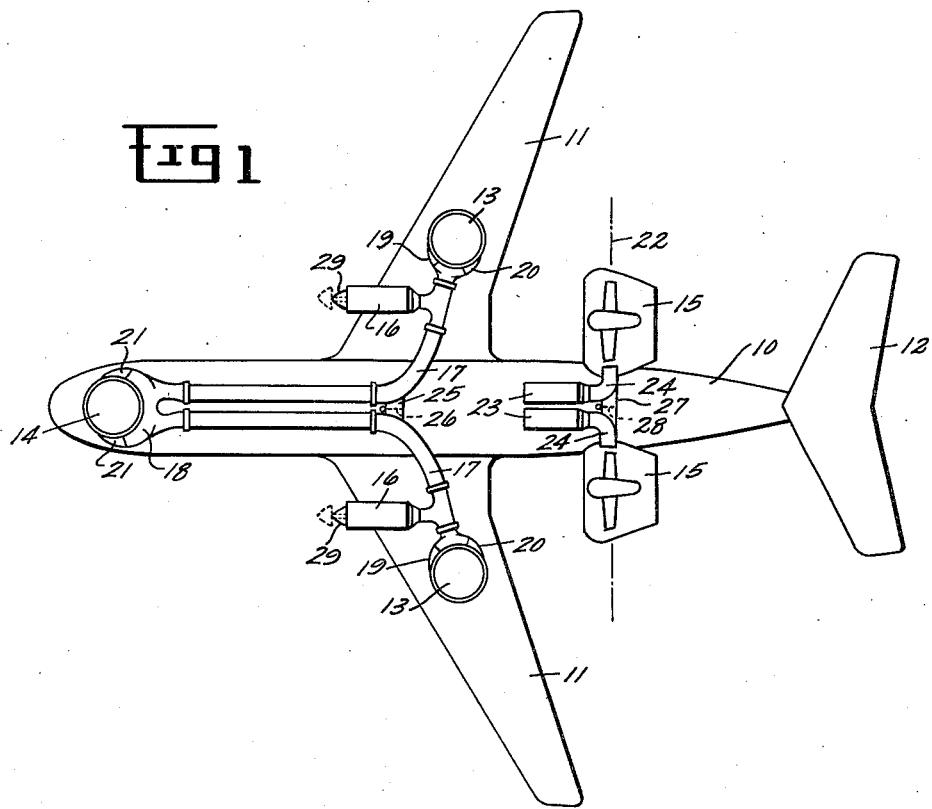
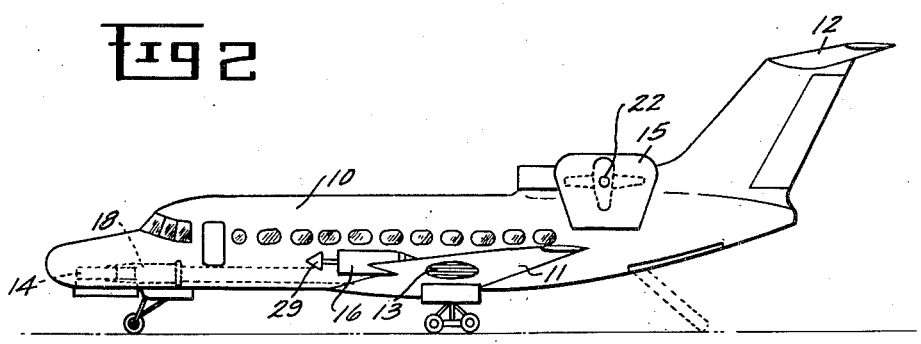
INVENTOR.
BRIAN H. ROWE
BY
ATTORNEY

United States Patent Office 3,038,683
Patented June 12, 1962

3,038,683
VTOL AIRCRAFT
Brian Henry Rowe, Cincinnati, Ohio, assignor to General
Electric Company, a corporation of New York
Filed Apr. 20, 1961, Ser. No. 104,328
8 Claims. (Cl. 244—12)

The present invention relates to a VTOL aircraft and, more particularly, to such an aircraft employing a plurality of fans and gas generators in a unique arrangement connected by an aerodynamic coupling.

In VTOL—vertical take-off and landing—aircraft a system that has come into prominence is the use of lift fans mounted in the vehicle wings or fuselage. By movement of large quantities of low pressure air through the fans, vertical lift may be obtained. Then the vehicle, if an aircraft, may continue in a vertical direction until suitable altitude is obtained at which time conversion can be made to horizontal movement by suitable jet reaction. This has been done by additional jet engines in the normal fashion and by diverting the fan discharge by louvers or suitable diverter valves to provide a horizontal component. Obviously, it is essential in an aircraft that balance be maintained at all times for suitable operation. The loss of a gas generator ordinarily can be fatal in an aircraft. During horizontal movement the normal ailerons provide roll control in a well known manner. However, in VTOL vehicles, during the hovering position, there is no movement of the air across the wings to provide this control and means are required to provide roll control or avoid any tendency to roll in the event of failure of a gas generator or fan. Similarly, pitch control is required in order to keep the vehicle on an even keel. The control system and powerplant arrangement should utilize components which do not enlarge the wings and add unnecessary weight to the aircraft. One scheme of roll control, when the ducting is simplified, is to be able to transfer power from one fan into another in order to provide the roll control and a cross-coupling arrangement between the various fans is provided so this power transfer may take place. Such an arrangement is the subject of co-pending application Serial No. 32,163 filed May 27, 1960, and assigned to the assignee of the instant invention. Another possible arrangement is to avoid unbalanced moments on the failure of the engine so that re-balancing is not necessary in order to avoid roll and so any delay due to pilot reaction time results in mere setting of the aircraft. Such an arrangement is the subject of co-pending application Serial No. 32,162 filed May 27, 1960, and assigned to the assignee of the instant invention. In VTOL aircraft in general, many schemes have been proposed including the fan-in-wing-arrangement with additional balancing fans for both roll and pitch control. Such arrangements have generally provided for mechanical interconnections between the fans and/or gas generators requiring extensive use of hardware and the ensuring complexities in the wing structure involved. Other VTOL arrangements have provided tilting powerplants or propellers that are used for both lifting and then tilted into the horizontal position for cruise application.

The omission of any unnecessary hardware, especially in an aircraft, is obviously of great importance and highly desired. Additionally, it is extremely important that, in the event of power failure, the aircraft be maintained stable and, if possible, retain its lift characteristics. The power failure possibility is especially critical during the hovering or vertical portion of the mission since, at this time, there is very little or no control on the aerodynamic lifting surfaces. Another desirable feature is the use of like components in size and/or aerodynamic design. The use of such components permits interchangeability between the parts in like components and permits growth versions in aerodynamically-like components to avoid the independent development programs necessary for specific powerplants. A further feature that is desirable is to have smooth transition control, i.e., during the period of transition between vertical and horizontal. This has been accomplished by the use of louvers on the vertical fans which also require the addition of hardware. Any elimination of the normal hardware is an advance in the lighter than air art so that an aircraft which can omit this structure is useful.

The term aerodynamic is used herein in the specification and claims and it is to be understood that it is merely a descriptive term for the gas coupling as disclosed herein and is obviously not intended to be confined strictly to air or conventional exhaust gases. In other words, it is intended to cover a "pneumatic" type system wherein no gearing and/or mechanical linkages are involved.

In VTOL aircraft it is anticipated that specifications will require continued flight during failure of any gas generator or with one engine out. With more than one engine out the air craft must be able to maintain its balance and may or may not, depending on the capacity designed into it, continue to fly. However, it is essential that the engine-out condition be made as safe as possible for the particular aircraft involved.

The main object of the present invention is to provide a VTOL aircraft that employs a unique arrangement of engines and fans and interconnections therebetween to provide for satisfactory vertical operation as well as economical and high speed cruise operation.

Another object is to provide such an aircraft which has sufficient roll and pitch control to be safe at all times.

A further object is to provide such an aircraft wherein the cruise engines and fans may be used as part of the lifting system and are economical in the cruise condition.

A further object is to provide such an aircraft wherein mechanical linkages between the elements are avoided and mixing problems from one or more gas generators involving complexities in the controls are similarly eliminated.

Another object is to provide such an aircraft fan-engine arrangement by which the aircraft can be balanced rapidly and easily in the event or roll or pitch during an engine failure while still maintaining lift.

Briefly stated, I provide a VTOL aircraft having tip turbine fans disposed in each wing and a third tip turbine fan disposed in the nose of the aircraft. The fans are symmetrically arranged about the longitudinal centerline of the aircraft. Each fan is driven by a separate gas generator feeding into a duct with no diverter valve. A gas generator is placed between each wing fan and the nose fan and connected by the duct or coupling system. This system is reproduced on the opposite side of the aircraft and, the two systems provide the pitch and roll control. A balance pipe with a valve in it is provided between the two coupling systems for use in the event of engine failure. Otherwise operation of the systems is independent. Attached to the fuselage aft of the wing fans are cruise and lifting tip turbine fans driven by central gas generator means. These fans are pivoted so that they may contribute to the lifting effort of the forward systems and cooperate therewith and are then used for cruise at low specific fuel consumption. The nose and cruise fans are identical and interchangeable. All the fans are aerodynamically similar.

While the specification concludes with claims particularly pointing out and distinctly claiming the subject matter which I regard as my invention, it is believed the invention will be better understood from the following description taken in connection with the accompanying drawing in which:

FIGURE 1 is a plan schematic view of an aircraft of the instant invention illustrating the location of the various components; and FIGURE 2 is a plan view of the same aircraft illustrating the cruise fans in the vertical position.

The use of a common duct, into which the gas generators or engines all discharge creates problems in mixing and control. By eliminating the common duct the control problem of the gas generators is simplified. The reason for this is that back pressure on one gas generator in a common duct may affect other gas generators on the same line to change their operation. By avoiding the common duct system it is not necessary to match temperatures, pressures, gas flows, and speeds in order to bring them all on the line. Thus, avoidance of the common duct feature where possible permits a simplified control of the gas generators or engines. The normal operation of the instant invention envisages a non-common duct. However, upon engine failure, it may be necessary to pipe exhaust from one of the gas generators into another line and, for this purpose, provision is made to then change the non-common duct into a common duct system in emergency.

Referring first to FIGURE 1, there is shown a diagrammatic plan view of the VTOL aircraft of the instant invention. This comprises a fuselage 10 having wings 11 extending therefrom and the usual and conventional tail structure 12. In order to provide propulsion to the aircraft, wing tip turbine fans 13, nose fan 14, and cruise fans 15 are provided. As seen, cruise fans 15 are placed outboard of the fuselage aft of the center of gravity and wing fans 13 in a manner that is well known. In order to drive the fans 13, 14, suitable gas generators 16 are provided. These may be the usual jet engines without providing for the normal rearward thrust. The connection between the gas generators and the fans comprises a ducting system and valving. For ease of description, since the opposite side of the aircraft is duplicated, it is only necessary to describe one side or assembly. The duct system or, as previously mentioned, aerodynamic coupling comprises coupling 17 connecting a wing fan and the nose fan. Surrounding each fan, at least partially, is a scroll 18 that directs the exhaust gases into the turbine of the fan. Scroll area control may be obtained by the use of suitable valves 19 and 20 in the wing fan scroll and valve 21 in the nose fan scroll respectively. The operation of these valves will be subsequently explained. The nose fan scroll may be divided at the centerline into two parts as shown to receive exhaust gas from each gas generator and prevent mixing of the exhaust of each of the gas generators.

It can be seen that the wing fans are symmetrical with respect to the longitudinal centerline and the nose fan located forward of the wing fans is symmetrically disposed on the longitudinal centerline of the aircraft. All these fans are designed to move air substantially vertically in a conventional manner to provide upward thrust on the aircraft. The individual details of the fans are not important since they are well known and comprise turbine buckets mounted on the periphery of fan blades to turn the fans.

The lift system of wing fans and nose fan is not designed to provide forward movement to the aircraft but merely act as lifting and, if required, yaw control components. Thus, in normal forward flight, suitable structure is provided to cover them in any manner deemed feasible and this is not shown. The assembly just described is duplicated on the opposite side of the aircraft and it can be seen that the nose fan receives half of its power from each gas generator 16 whereas the wing fan on the same coupling as the gas generator receives all its power from that gas generator. Thus, each side of the aircraft represents a separate and independent assembly.

Each wing fan is preferably in the plane of the wing with its scroll extending partially around the turbine of the fan. The gas generator 16 is disposed between the wing fan and the nose fan and preferably although not necessarily in the wing in order to avoid compromising the aircraft as might be required if the gas generators were located in the fuselage requiring additional ducting for air flow. The absence of interconnecting hardware and linkage will be apparent in such a pneumatic coupling wherein the exhaust of the gas generator 16 directly drives each fan to which it is connected. By suitably locating the wing fans and nose fan on opposite sides of the center of gravity of the aircraft it can be seen that the forward lifting assembly of fans and gas generators can be used for both roll and pitch control. Further, by the use of the two independent assemblies, a smaller coupling 17 may be piped forward in duplicate thus reducing the engineering problems and control complexities encountered in a large single pipe where mixing takes place.

Horizontal movement or cruise is obtained by means of the aft cruise fans 15 which are disposed on either side of the fuselage aft of the wing fans and center of gravity. These cruise fans 15 are mounted to be rotatable about a transverse axis 22 so that they can be placed in a vertical position as shown in FIGURE 2. In this position, they contribute to the lift of the aircraft. In any intermediate position, they are of assistance in transition from vertical to horizontal flight. Thus, cooperation between the forward assemblies and aft system is ensured by obtaining lift from the forward assemblies and lift and cruise from the aft system. By rotating the engines between the two positions the transition capabilities of the aircraft are increased. Cruise fans 15 are driven independently directly by exhaust gas from fuselage mounted gas generating means 23 which may comprise, for safety reasons, two or more gas generators. An aerodynamic coupling or duct system 24 interconnects each gas generator with the aft cruise fan. The rotating feature permits selectivity to produce thrust on the aircraft in the vertical direction at which time it cooperates to balance the thrust from the forward fan 14 and thrust on the aircraft in the horizontal direction for forward motion. During cruise the forward assemblies are shut down and the center bodies 29 are retracted thereby shutting off the airflow to the gas generator and reducing the drag of the aircraft.

In the event of engine failure, it is important that the aircraft be maintained on an even keel and, for this reason, interconnections are provided which are used in emergency only. For this purpose, a balancing pipe 25 is provided between the forward assemblies in the duct system and pipe 25 is provided with a valve 26 therein which is normally closed except in emergency. Similarly, a balancing pipe 27 with a similar valve 28 is provided in the duct system between the cruise fans.

It is well to note that the arrangement of parts on the instant aircraft, while providing for safety as well as economical cruise by means of the aft fans that cooperate with the forward system for vertical lift, that the various fans are either interchangeable with one another or are growth versions. For example, fans 14 and 15 may be completely interchanged. Smaller wing fans 13 are aerodynamically-like fans. The term "aerodynamically-like" means that the fans are of the same family and merely growth versions of one another to avoid additional design or development work and the arrangement permits such like fans to be used. That is, the fans have the same pressure ratios, same blade angles, same seals and same tip speeds. Thus, each is merely a growth version of the other. The nose and cruise fans are identical and interchangeable.

In the event of an engine failure, it is imperative that the aircraft maintain an even keel and for this purpose valves 25 and 28 are provided. As an illustration, if it is assumed, in FIGURE 1, that the upper gas generator 16 fails, then valve 25 is opened so that upper fan 13 may be driven by lower gas generator 16. Obviously, the lift provided by the fans will be less but lift is provided and rolling is avoided. In order to balance the amount to each fan, valves 19 and 20 in each fan may be appropriately controlled so that each fan receives equal power. At the same time, valve 21 in the nose fan 14 will be opened or closed in order to provide pitch control because of the lower lift from fans 13 due to the upper engine or gas generator-out condition.

In normal operation, due to gusts or any tendency of the aircraft to roll, balance may also be obtained quite easily. Assume that more lift is desired from the lower fan engine 13 and less is desired from the upper fan engine 13 in FIGURE 1. By shutting valve 21 in nose fan 14 in the lower portion, and opening valve 20 in lower fan 13, it can be seen that lower fan 13 receives more power from its gas generator 16 at the expense of nose fan 14 which has now been cut down. This alone may be sufficient to correct the roll or it may be necessary to open valve 21 in the upper portion of fan 14 and close valve 19 in upper fan 13. Thus the forward fan receives more of the power from upper gas generator 16 and upper wing fan 13 receives less power. Thus, roll control may be maintained while at the same time pitch control is undisturbed because the nose fan 14 has received additional power in the upper portion to compensate for the power lost in the lower portion. Thus, the front fan is really a balancing valve for the whole aircraft system because it controls the amount of power transfer between the three fans.

It is to be noted that the gas generators 16 and 23 are intended to be identical for interchangeability and, while gas generators 23 require control hardware therewith because they are operative to drive fans 15 both in vertical lift and cruise position, gas generators 16 do not require the control complexity because they are used only for lift. Thus, gas generators 16 may be used as spares since the lift portion of the mission is only a small percentage of the total mission. Generators 16 may then be interchanged with generators 23 to provide for equal use on all the engines. By using the tip turbine fans on the aft end of the fuselage as cruise fans it is possible to take advantage of the low specific fuel consumption of this type of powerplant and at the same time use them for lifting to compensate during the lifting portion due to the reaction of nose fan 14.

By using the two independent forward assemblies with the aerodynamic coupling or duct systems as disclosed, the need for special engine controls is avoided and yet the advantages of the common duct is present due to the balancing pipe 25 as needed for emergency only. Also the independent assemblies eliminates the hardware complexities required in the common duct system.

Thus, the instant invention provides a VTOL aircraft that is unique in its arrangement of fans and interchangeability features as well as providing complete safety under practically all conditions of operation.

While I have hereinbefore described a preferred form of my invention, obviously many modifications and variations of the present invention are possible in the light of the above teachings. It is therefore to be understood that within the scope of the appended claims, the invention may be practiced otherwise than as specifically described.

I claim:

1. A VTOL aircraft comprising, a fuselage, wings extending therefrom, a tip turbine fan in each wing symmetrically disposed about the longitudinal centerline of the aircraft, a third tip turbine fan forward of the wing fans and disposed symmetrically on the longitudinal centerline of the aircraft, all said fans being mounted to move air substantially vertically for vertical lift, a gas generator between each wing fan and the third fan, an aerodynamic coupling system interconnecting each wing fan, said third fan, and the gas generator therebetween, whereby the gas generator exhaust directly drives said connected fans, each gas generator supplying all the power required to its connected wing fan and half the power required to its connected third fan, a balance pipe interconnecting said aerodynamic couplings, a valve in said balance pipe operable to connect said aerodynamic couplings in the event of gas generator failure, tip turbine fan means disposed on each side of the fuselage rearwardly of the wing fans and driven directly by the exhaust of gas generator means independent of said first mentioned gas generator means, said rear fan means being rotatably mounted on said fuselage for selectively producing thrust on the aircraft in the vertical and horizontal direction.

2. A VTOL aircraft comprising, a fuselage, wings extending therefrom, a tip turbine fan in each wing symmetrically disposed about the longitudinal centerline of the aircraft, a third tip turbine fan forward of the wing fans and disposed symmetrically on the longitudinal centerline of the aircraft, scrolls at least partially surrounding each fan, all said fans being mounted to move air substantially vertically for vertical lift, a gas generator between each wing fan and the third fan, a separate aerodynamic coupling system interconnecting each wing fan and said third fan scrolls and the gas generator therebetween, whereby each gas generator exhaust directly drives its connected fans through its coupling system independently of the other coupling system, each gas generator supplying all the power required to its connected wing fan and half the power required to its connected third fan, a balance pipe interconnecting said aerodynamic couplings, a valve in said balance pipe operable to connect said aerodynamic couplings in the event of gas generator failure, tip turbine fans means disposed on each side of the fuselage rearwardly of the wing fans and driven directly by the exhaust of gas generator means independent of said first mentioned gas generator means, said rear fan means being rotatably mounted on said fuselage for selectively producing thrust on the aircraft in the vertical direction to balance said third fan thrust, and thrust on the aircraft in the horizontal direction for forward motion.

3. Apparatus as described in claim 2 wherein the first mentioned gas generators driving said wing fans and third fan are mounted on said wings outboard of the fuselage and inboard of the wing fans.

4. Apparatus as described in claim 3 wherein the rear fan means are driven by independent gas generator means mounted within said fuselage.

5. Apparatus as described in claim 3 wherein each rear fan is directly driven through a connecting duct by exhaust gases from a separate gas generator within said fuselage, a balance pipe between the connecting ducts and a valve in said balance pipe.

6. A VTOL aircraft comprising, a fuselage, wings extending therefrom, a lift system for said aircraft comprising, a first assembly having a tip turbine fan structure mounted for rotation in the plane of one wing including a scroll extending at least partially around the turbine of said fan, a fan structure mounted in the nose of the aircraft and centered on the longitudinal centerline of the aircraft, said fans adapted to move air vertically for vertical lift on the aircraft, a gas generator disposed between the fans, an aerodynamic coupling system interconnecting the gas generator and scrolls to drive the fans directly by gas generator exhaust, said wing fan receiving all its power and said nose fan receiving half its power from said gas generator; another fan structure independent of said assembly and disposed aft of said wing fan on the side of said fuselage, said other fan being mounted for selective rotation on said fuselage to produce lift in one position and balance the thrust from said nose fan and to produce horizontal thrust for forward motion in another position, said other fan having a scroll, independent gas generator means connected to said other fan scroll to drive said fan directly by gas generator exhaust, a second identical assembly and other fan structure symmetrically disposed on the opposite side of said fuselage, said nose fan being common to each assembly and receiving half its power therefrom, a balance pipe interconnecting said aerodynamic couplings, a valve in said balance pipe to connect said aerodynamic couplings in the event of gas generator failure.

7. Apparatus as described in claim 6 wherein the first mentioned gas generators driving said wing fans and nose fan are mounted on said wings outboard of the fuselage and inboard of the wing fans.

8. Apparatus as described in claim 7 wherein the other like aft fan structure is driven by independent gas generator means mounted within said fuselage.

References Cited in the file of this patent

UNITED STATES PATENTS

| 2,863,620 | Vautier | Dec. 9, 1958 |
| 2,990,138 | Shaw | June 27, 1961 |

FOREIGN PATENTS

| 811,840 | Great Britain | Apr. 15, 1959 |
| 846,300 | Great Britain | Aug. 31, 1960 |
| 847,868 | Great Britain | Sept. 14, 1960 |